United States Patent [19]

Bobo

[11] Patent Number: 5,149,206
[45] Date of Patent: Sep. 22, 1992

[54] HYDRAULIC SHAFT DAMPER PRESSURE CONTROL

[75] Inventor: Melvin Bobo, Cincinnati, Ohio

[73] Assignee: General Electric Company, Cincinnati, Ohio

[21] Appl. No.: 686,444

[22] Filed: Apr. 17, 1991

[51] Int. Cl.⁵ .............................................. F16C 39/04
[52] U.S. Cl. ........................................ 384/99; 248/562
[58] Field of Search ................ 384/99, 255, 535, 581; 248/562

[56] References Cited

U.S. PATENT DOCUMENTS

| | | | |
|---|---|---|---|
| 4,669,893 | 6/1987 | Chalaire et al. | 384/99 |
| 4,775,248 | 10/1988 | Barbic et al. | 384/99 |
| 4,782,919 | 11/1988 | Chalaire et al. | 384/99 |
| 4,783,179 | 11/1988 | Katayama et al. | 384/130 |
| 4,947,639 | 8/1990 | Hibner et al. | 384/99 |
| 4,992,024 | 2/1991 | Heydrich | 384/99 |
| 5,067,825 | 11/1991 | Vance et al. | 384/99 |

OTHER PUBLICATIONS

Experimental Measurement of the Dynamic Force Response of a Squeeze-Film Bearing Damper, by John M. Vance-Transactions of the ASME, Nov. 1975, pp. 1282-1290.

Primary Examiner—Lenard A. Footland
Attorney, Agent, or Firm—Jerome C. Squillaro; John R. Rafter

[57] ABSTRACT

A flow control ring in a concentric groove in the outer surface of an outer rolling element bearing race of a shaft fluid damper has an inner diameter larger than the inner diameter of the groove and moves in the groove to control discharge of damper fluid through radial fluid flow passages in the groove for fluid pressure control in the damper.

16 Claims, 4 Drawing Sheets

HYDRAULIC SHAFT DAMPER PRESSURE CONTROL

BACKGROUND OF THE INVENTION

This invention relates to a squeeze film shaft damper for rotating machines such as hot gas turbine engines, and more particularly, to damping fluid pressure control in such dampers.

Squeeze film shaft dampers permit a shaft and an associated bearing to have some limited radial movement in a bearing housing where a thin annular squeeze film space is defined between a circumferential bearing member, usually the annular outer race of a rolling element bearing, and an opposite circumferential wall of an annular chamber in the bearing housing in which the bearing race is housed. A damper fluid, usually an oil, is introduced into the annular squeeze film space to generate a resistance to radial motion of the shaft and its associated bearing in the bearing housing chamber. An imbalance in the gas turbine rotor-shaft assembly, for example, may cause the rotor shaft to undergo limited orbital motion which is transmitted to its supporting bearing to cause the outer race of the bearing to undergo orbiting motion in its housing chamber. This orbiting motion generates a very high fluid pressure wave moving circumferentially in the described annular squeeze film space which provides fluid resistance to further shaft radial and orbital motion. Damping action in a damper causes a significant temperature rise in the damper fluid, and heat is dissipated from the damper by means of continuous recirculation of oil to and from the squeeze film space. It is important in effective damper operation to control and maintain the described circumferentially moving pressure wave while at the same time recirculating oil through the damper without deleteriously affecting the pressure wave.

OBJECTS OF THE INVENTION

Accordingly, it is an object of this invention to provide improved pressure control of a rotating pressure wave in a squeeze film shaft fluid damper.

It is another object of this invention to provide improved oil recirculation in a damper.

It is a further object of this invention to provide internal combined control means in a squeeze film damper to support a circumferentially moving pressure wave while at the same time effectively supporting recirculation of oil through a damper.

Another object is to provide a ring valve means activated by a circumferentially traveling pressure wave in the damper to maintain damper fluid pressure in a high pressure region of the traveling wave while opening fluid discharging means in an opposite low pressure region of the traveling pressure wave.

SUMMARY OF THE INVENTION

A rolling eccentric control ring member in a squeeze film damper acts as a pressure activated moving valve element to timely close off fluid passages in the highest pressure region of zone of a circumferentially moving pressure wave therein to sustain the wave, while simultaneously opening fluid passages in a low pressure zone of the pressure wave permitting the necessary damper fluid recirculation to maintain proper operating temperature. The eccentric control ring serves as a series of mechanically coupled check valves.

This invention will be better understood when taken in connection with the following description and drawings.

BRIEF DESCRIPTION OF PREFERRED EMBODIMENTS

Figure 1:
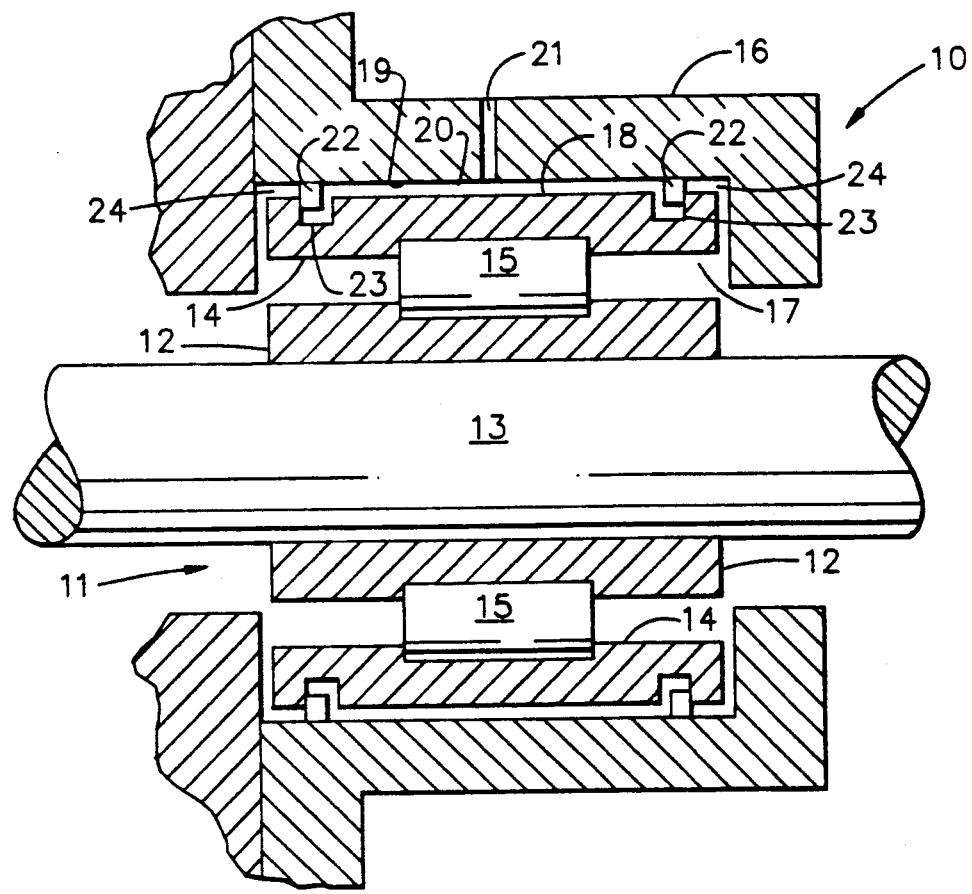
FIG. 1 is a cross section schematic illustration of a known squeeze film shaft fluid damper.

Referring now to FIG. 1 a known fluid damper assembly 10 is combined with a rolling element bearing assembly 11 having an inner race 12 which encircles a shaft 13, and a bearing support member 14, such as spaced outer annular race 14, with rolling elements 15 therebetween. A bearing housing 16 includes an annular chamber 17 therein in which the outer annular race 14 is slidingly received for radial motion therein. Outer circumferential surface 18 of race 14 fits closely adjacent the inner and opposite circumferential surface 19 of chamber 17 to define a thin annular squeeze film space 20. A damper fluid such as an oil, under pressure, is supplied to damper space 20 through an inlet passage 21 from a source (not shown). Any radial motion of shaft 13 resulting from a vibrational force, for example, causes race 14 to move radially in chamber 17 to decrease the radial height of a region of damper space 20 and subject the fluid therein to a very high pressure.

Damper fluid is retained in space 20 by seal means such as gap piston ring seals 22 at each end of space 20. For this purpose, race 14 includes a pair of concentric spaced apart piston ring grooves 23 in its outer circumferential surface 18, one groove adjacent each side of race 14. The axially spaced-apart pair of piston rings 22 are in sealing engagement with the opposing circumferential surface 19 of annular chamber 17 to provide annular seals for damper space 20 therebetween.

Radial motion of shaft 13 is directly transmitted to race 14 so that shaft 13, bearing assembly 11 and races 12 and 14 move as a unit. As race 14 moves radially in chamber 17, fluid in space 20 is compressed in the region of space 20 where surface 18 is moving toward surface 19.

During engine operation, turbine shaft 13 in bearing 11 undergoes some orbital or eccentric motion, which is directly transmitted to bearing race 14 to have the same orbital motion in its annular chamber 17. This eccentric or orbital motion of race 14 in chamber 17 alternately squeezes (compresses) one region of squeeze film space 20 to generate a very high fluid pressure region, while in the opposite region of space 20 where space surface 18 is moving away from surface 19, the radial height of space 20 is increasing, thereby forming a lower pressure region. The orbiting motion and alternate higher and lower fluid pressures generate a circumferentially traveling pressure wave in annular space 20, which damps the shaft motion.

The forces involved in generating and sustaining this circumferentially moving pressure wave not only exert a significant resistance and damping effect on continued orbiting motion, but also result in raising the damper oil temperature. One problem associated with the circumferentially moving pressure wave is the need for continuous damper fluid supply and withdrawal, as required for oil cooling treatment and optimum damper operation. As noted in FIG. 1, damper oil is introduced into squeeze film space 20 through inlet 21. Oil is typically removed from space 20 by controlled leakage past the piston ring seal means 22, into regions 24 (FIG. 1), to return through associated clearances to a sump region (not shown).

Oil delivery, through inlet 21, for example, should be carefully controlled with respect to the passing pressure wave which may include a peak pressure at the same time and position where oil is attempting to enter squeeze film space 20. To avoid the occurrence of having a higher peak pressure in squeeze film space 20 than the pressure of the inlet oil in passage 21, which would thwart oil delivery and possibly cause over pressure conditions in the oil delivery system, one way flow check valves are usually employed in appropriate oil inlet passages such as passages 21. Such check valves prevent backflow and over pressure conditions, and at the same time prevent removal of fluid from the high pressure region, which would result in deterioration of the traveling pressure wave.

Oil removal from squeeze film space 20 should also be carefully controlled with respect to the passing pressure wave. One condition to be avoided is removal of oil from the high pressure region of the squeeze film space. Removing oil from the high pressure region diminishes the magnitude of the travelling pressure wave and reduces damper effectiveness. Known damper systems that rely on discharge leakage past seals 22 are disadvantageous in that almost all the discharge leakage past seals 22 occurs in the high pressure region of squeeze film 20, thereby diminishing the pressure wave. Another condition to be avoided is air entrainment in squeeze film space 20 in the lower pressure region of the damper where, due to the orbital motion as described, squeeze film space 20 is at near its thickest dimension. A flow through damper oil recirculation system which does not depend on leakage past seals 22, but instead uses a control means which withdraws oil from a low pressure region in the damper during its orbital operation, and prevents oil exiting from the orbital high pressure region, would be an improvement in damper function.

The control ring and groove of this invention maintains the generated pressure wave by discharging oil from only a low pressure region in squeeze film space 20. The control ring and groove combination serves as a series of mechanically coupled check valves which are activated by the circumferentially traveling pressure wave in the squeeze film space 20. The ring and groove combination closes a high pressure region of space 20 from oil discharge passages, while opening a lower pressure region of space 20 to oil discharge passages. Thus, oil discharge does not diminish the magnitude of the pressure wave in the high pressure region of squeeze film space 20. Also, since the piston ring seal means do not provide the discharge path from space 20, they can be designed to provide for optimum sealing to prevent oil discharge from the pressure wave high pressure region and air entrainment into the pressure wave low pressure region.

Figure 2A:
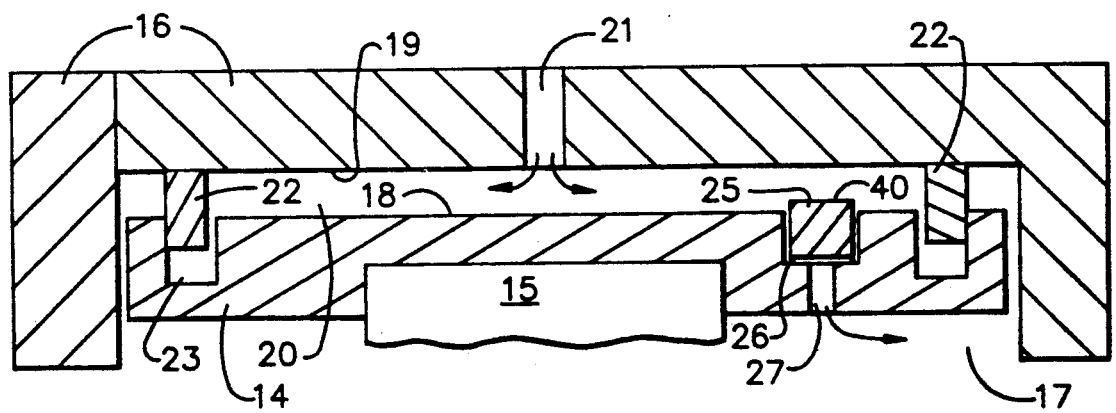
FIG. 2a is a cross section schematic illustration of a squeeze film damper space showing the damper fluid control ring of this invention disposed in a bearing race.
Figure 2B:
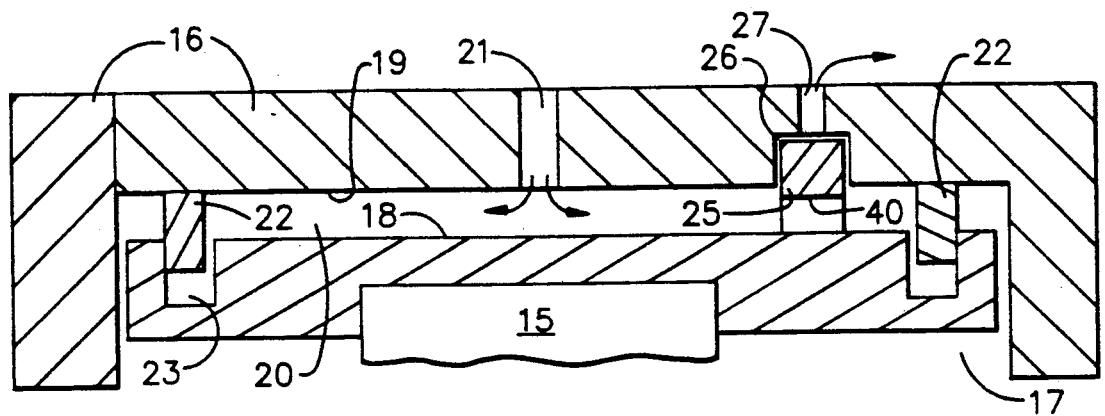
FIG. 2b is a cross section schematic illustration of a squeeze film damper space showing the damper fluid control ring of this invention disposed in a bearing housing.

FIG. 2a shows the control ring and groove of the present invention. As illustrated in FIG. 2a, control ring 25 can encircle outer race 14 and resides in radial sliding relationship in a ring groove 26. Alternatively, the control ring 25 can reside in a similar groove 26 in surface 19 of housing 16, as shown in FIG. 2b. The invention will be described in terms of the control ring 25 and groove 26 as shown in FIG. 2a, it being understood that the description will apply with only minor modifications to the embodiment shown in FIG. 2b.

Figure 3:
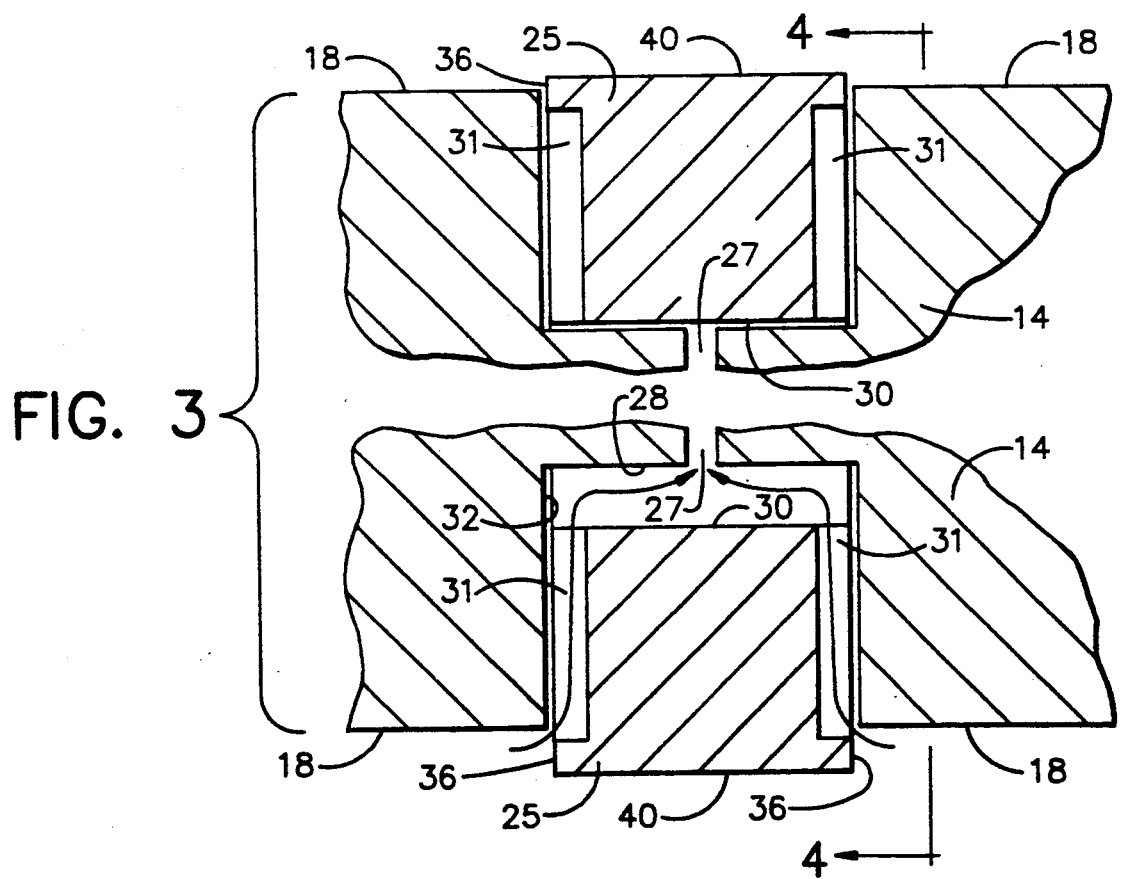
FIG. 3 is a partial cross-sectional schematic illustration of a preferred embodiment of the control ring of FIGS. 2a and 2b, the upper portion showing the control ring in a closed position and the lower portion showing the control ring in an open position.

Referring to FIGS. 2a and 3, a plurality of circumferentially spaced, radially extending discharge passages 27 lead from the bottom surface 28 (FIG. 3) of groove 26 through race 14 to a generally low external sump pressure. The internal diameter of ring. 25 is sized slightly larger than the diameter of groove bottom surface 28 to permit ring 25 be positioned eccentrically in groove 26. Ring 25 is preferably a full circle 360 degree ring. Ring 25 can extend into squeeze film space 20, and can be sized with respect to groove 26 to avoid metal to metal contact with housing surface 19 during operation.

In a preferred embodiment, ring 25 can include a pair of radially and circumferentially extending ring sidewalls 36. The sidewalls can be axially spaced apart by inner and outer cylindrical ring surfaces 30 and 40. Groove 26 can include a pair of radially and circumferentially extending groove sidewalls 32. Ring 25 preferably fits closely in groove 26 with the minimum axial clearance between ring and groove sidewalls which permits smooth radial motion of ring 25 in groove 26. This minimum clearance will vary depending on bearing size, and can be calculated by those skilled in the art of mechanical design.

Figure 4:
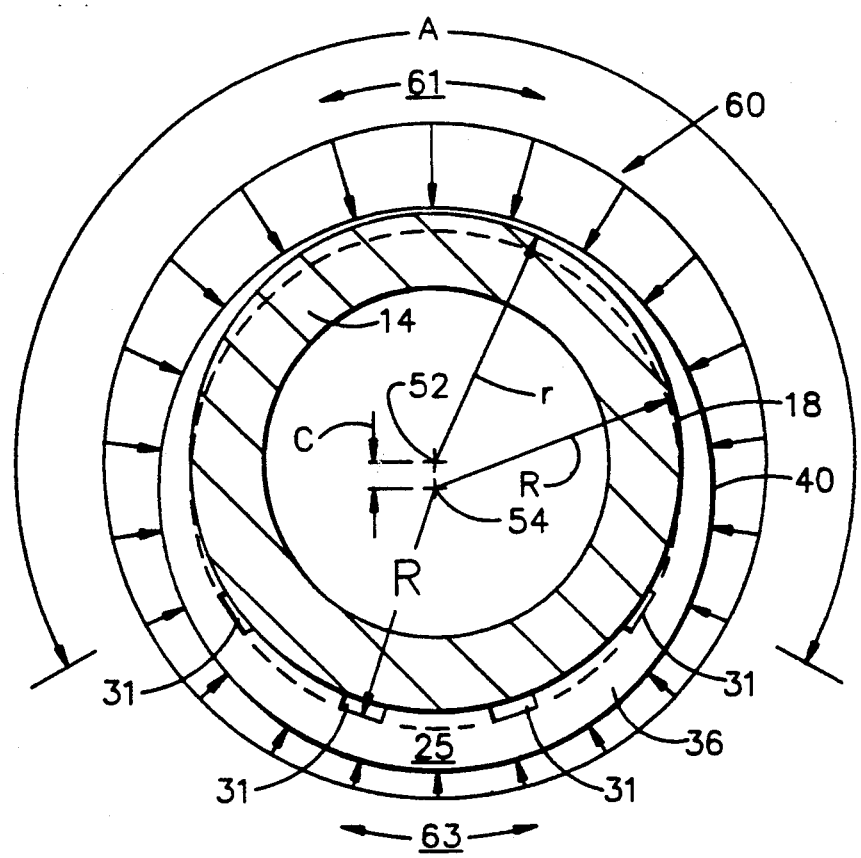
FIG. 4 is a partial cross-sectional schematic illustration of the control ring taken along line 4—4 in FIG. 3 showing the position of the control ring relative to a bearing race.

A plurality of radially extending and circumferentially spaced-apart channels 31 can be disposed in radially extending ring sidewalls 36. Channels 31 are preferably uniformly and circumferentially spaced around ring sidewalls 36 (FIG. 4). Channels 31 extend from ring inner cylindrical surface 30 and terminate intermediate inner cylindrical surface 30 and outer cylindrical surface 40, at a ring radius R shown in FIG. 4.

Operation of the automatic ring control of this invention is best described with respect to FIGS. 3 and 4. FIG. 4 is taken along lines 4—4 in FIG. 3, and illustrates the eccentric positioning of ring 25, having a center 54, within race 14 having a center 52. The eccentricity of ring 25 within race groove 26 is represented by dimension c, where c is the difference between the diameter of ring inner surface 30 and the diameter of groove surface 28. Radius R represents the radial extent of channels 31, while radius r represents the radius of race surface 18.

The squeeze film circumferentially traveling pressure wave 60, with high and low pressure regions 61 and 63, is shown acting on ring outer cylindrical surface 40 in FIG. 4. The pressure acting on ring inner cylindrical surface 30 will be substantially an external sump pressure, which will be lower than the pressure in squeeze film space 20. Thus, as race 14 orbits in chamber 17, the resultant force on ring 25 due to circumferentially traveling pressure wave 60 will cause ring 25 to be urged radially into groove 26 near the high pressure region 61 of wave 60, with a corresponding and simultaneously movement of ring 25 outward from the groove near the low pressure region 63.

Movement of ring 25 into groove 26 thereby closes off the high pressure region of squeeze film space 20 from channels 31 (and thus from discharge passages 27), where channels 31 are radially inward of race surface 18 and closely fitting ring and groove sidewalls 36 and 32 restrict flow from space 20 to channels 31. Simultaneously, channels 31 (and thus discharge passages 27) are open to discharge from the low pressure region 63 in squeeze film space 20 where channels 31 are radially outward of race surface 18. The eccentric ring action as described is automatic, requiring no external control to be effective, and is actuated by the very occurrence (traveling pressure wave) which it affects or controls.

Angle A in FIG. 4 represents the angular extent of sealing of squeeze film space 20 from discharge passages 27. Since space 20 is sealed from passages 27 to the extent that channels 31 are radially inward of bearing race surface 18, the angular extent of sealing can be tailored to a specific application by varying eccentricity, c, or the radial extent of channels 31, R. Angle A is preferably greater than 180 degrees to ensure pressure wave 60 is not diminished by discharge flow out of high pressure region 61.

Figure 5:
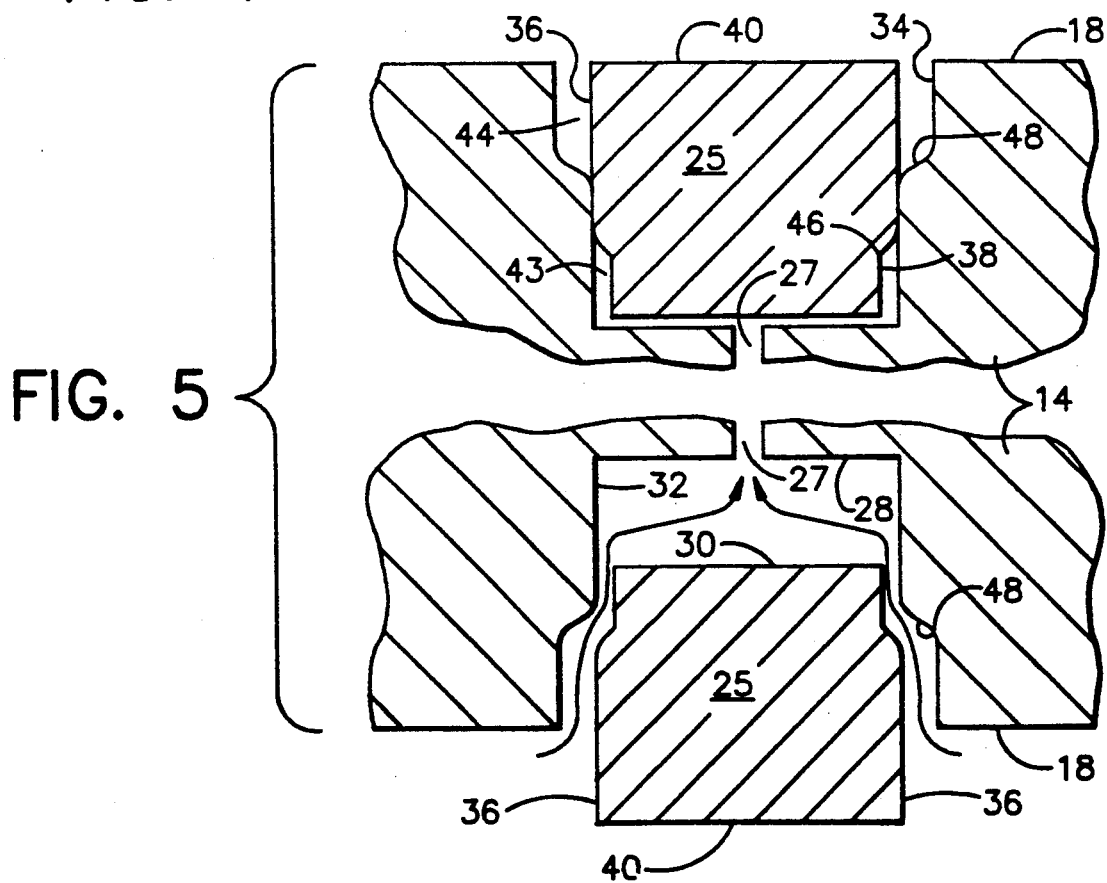
FIG. 5 is a partial cross-sectional schematic illustration of an alternative embodiment of the control ring of this invention.
Figure 6:
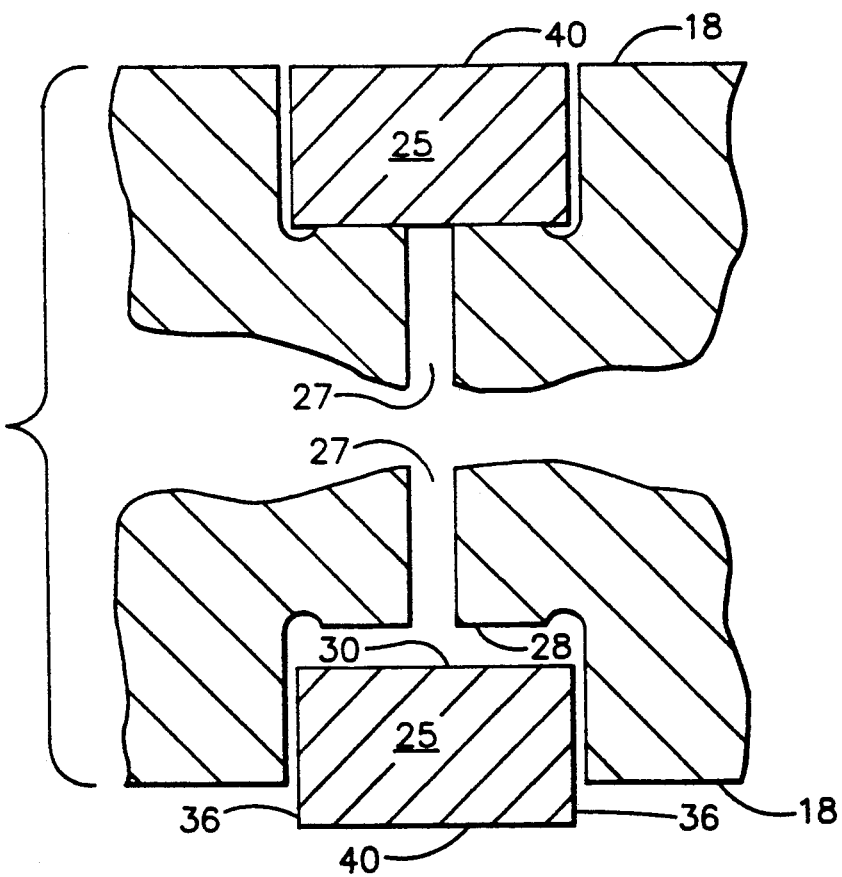
FIG. 6 is a partial cross-sectional schematic illustration of another alternative embodiment of the control ring of this invention.

Alternate ring and groove combinations are shown in FIGS. 5 and 6. Referring to FIG. 5, the ring 25 and groove 26 can have a generally T-shaped cross sections, which seal squeeze film space 20 from discharge passages 27 where ring sidewalls 36 overlap groove sidewalls 32. FIG. 6 shows an alternate embodiment of the ring and groove combination where sealing is provided by ring inner cylindrical surface 30 and groove outer cylindrical surface 28.

While this invention has been disclosed and described with respect to a preferred embodiment, it will be understood by those skilled in the art that various changes and modifications may be made without departing from the spirit and scope of the invention as set out in the following claims.

I claim:

1. A squeeze film damper for use in a gas turbine engine, the damper comprising:
   (a) an annular bearing support member positioned in an annular chamber where opposing circumferential surfaces of said chamber and said support member define an annular squeeze film space therebetween, and where motion of said bearing support member generates a circumferentially moving fluid pressure wave in the squeeze film space; and
   (b) damper fluid control means in said damper and operative by the damper fluid pressure wave in said squeeze film space to prevent discharge of damper fluid from a relatively high pressure region of the squeeze film space, and permit discharge of damper fluid from an opposite, relatively low pressure region of said squeeze film space.

2. The damper recited in claim 1, wherein the damper fluid control means comprises a ring and groove combination, and wherein damper fluid discharge is controlled by eccentric motion of the ring in its groove.

3. The damper recited in claim 2, wherein the groove of the ring and groove combination is disposed in the bearing support member circumferential surface.

4. The damper recited in claim 2, wherein the groove of the ring and groove combination is disposed in the chamber circumferential surface.

5. The damper as recited in claim 2, wherein the ring and groove combination includes closely spaced ring and groove sidewalls which seal discharge flow from the relatively high pressure region of the squeeze film space during eccentric motion of the ring in its groove.

6. The damper recited in claim 5, wherein at least one ring sidewall includes a plurality of generally radially extending channels in flow communication with a plurality of discharge passages, and wherein at least one channel is open to discharge flow from the relatively low pressure region of the squeeze film space during eccentric motion of the ring in its groove.

7. A squeeze film damper for use in a gas turbine engine, the damper comprising:
   (a) a bearing support member positioned in an annular housing chamber where opposing circumferential surfaces of the chamber and the support member define an annular damper fluid squeeze film space therebetween;
   (b) at least one damper fluid inlet means for supplying damper fluid to the squeeze film space;
   (c) seal means disposed at each end of the squeeze film space;
   (d) a circumferentially extending groove disposed in one of the circumferential surfaces, the groove intermediate the seal means, and the groove in flow communication with a damper fluid discharge means; and
   (e) a control ring disposed for eccentric motion in the groove.

8. The damper recited in claim 7, wherein the groove includes a circumferentially extending groove surface extending between groove sidewalls, and wherein control ring includes a pair of ring sidewalls, each ring sidewall facing at least a portion of an oppositely facing groove sidewall.

9. The damper recited in claim 8, wherein the damper fluid discharge means includes a plurality of discharge passages disposed in the circumferentially extending groove surface.

10. The damper recited in claim 8, wherein at least one ring sidewall includes a plurality of spaced apart channels in flow communication with the flow discharge means, the channels on one side of the ring open to flow communication with the squeeze film space, and the channels on an opposite side of the ring closed to flow communication with the squeeze film space when the ring is positioned eccentrically within its groove.

11. A method of controlling damper fluid pressure in a squeeze film damper space, comprising the steps of:
   (a) supplying damper fluid to the squeeze film space;
   (b) sealing the ends of the squeeze film space;
   (c) opening a relatively low pressure region of the squeeze film space to fluid communication with a fluid discharge means intermediate the ends; and
   (d) closing a relatively high pressure region of the squeeze film space to fluid communication with the fluid discharge means.

12. The method of claim 11, including the step of actuating the opening and closing of the respective regions of the squeeze film space with the damper fluid pressure.

13. The method of claim 11, including the step of mechanically coupling the opening and closing of the respective regions of the squeeze film space.

14. The method of claim 11, including the step of eccentrically moving a control ring within a groove, which is in fluid communication with the damper fluid discharge means, to open and close the respective regions of the squeeze film space.

15. The method of claim 14, including the step of actuating the eccentric movement of the control ring with the damper fluid pressure.

16. The method of claim 14, including the step of opening channels, which are disposed in the control ring and in flow communication with the fluid discharge means, to flow communication with the relatively low pressure region in the squeeze film space.

* * * * *